United States Patent [19]

König et al.

[11] Patent Number: 5,961,878
[45] Date of Patent: Oct. 5, 1999

[54] AMINE-BLOCKED POLYISOCYANATES AND THEIR USE IN ONE-COMPONENT STOVING COMPOSITIONS

[75] Inventors: Eberhard König, Leverkusen; Karl-Ludwig Noble, Bergisch Gladbach; Christian Füssel, Tönisvorst, all of Germany

[73] Assignee: Bayer Aktiengesellschaft, Leverkusen, Germany

[21] Appl. No.: 09/145,740

[22] Filed: Sep. 2, 1998

[30] Foreign Application Priority Data

Sep. 3, 1997 [DE] Germany .......................... 197 38 497

[51] Int. Cl.$^6$ .......................... C08G 18/80; C08G 18/73; C08G 18/75; C08G 18/78; C08G 18/79; C07G 273/18; C07G 275/06; C07G 275/26

[52] U.S. Cl. .......................... 252/182.21; 252/182.22; 252/182.29; 524/718; 524/728; 528/45; 528/59; 528/60; 528/65; 528/48; 528/49; 528/67; 528/85; 540/202; 548/951; 548/952; 560/115; 560/157; 560/158; 560/331; 560/335; 560/355; 564/32; 564/37; 564/38; 564/44; 564/45; 564/57; 564/61; 544/222

[58] Field of Search .......................... 252/182.21, 182.29, 252/182.22; 524/718, 728; 528/48, 49, 45, 60, 65, 67, 85; 544/222; 548/951, 952; 560/115, 157, 158, 331, 335, 355; 564/32, 37, 38, 44, 45, 57, 61; 540/202

[56] References Cited

U.S. PATENT DOCUMENTS

| | | | |
|---|---|---|---|
| 4,369,301 | 1/1983 | König et al. | 528/45 |
| 4,495,229 | 1/1985 | Wolf et al. | 427/388.2 |
| 4,658,005 | 4/1987 | Gras et al. | 528/45 |
| 5,061,775 | 10/1991 | Schmalstieg et al. | 528/45 |
| 5,219,975 | 6/1993 | Schmalstieg et al. | 528/45 |
| 5,350,825 | 9/1994 | König et al. | 528/45 |
| 5,523,377 | 6/1996 | Konig et al. | 528/45 |
| 5,563,208 | 10/1996 | Konig et al. | 524/591 |
| 5,691,438 | 11/1997 | Konig et al. | 528/45 |

*Primary Examiner*—Rabon Sergent
*Attorney, Agent, or Firm*—Joseph C. Gil; Thomas W. Roy

[57] ABSTRACT

The invention relates to non-crystallising, amine-blocked polyisocyanates, to the preparation thereof and to their in one-component polyurethane stoving compositions, in particular for coil-coating applications.

4 Claims, No Drawings

AMINE-BLOCKED POLYISOCYANATES AND THEIR USE IN ONE-COMPONENT STOVING COMPOSITIONS

BACKGROUND OF THE INVENTION

1. Field of the Invention

The present invention relates to non-crystallising, amine-blocked polyisocyanates, to their preparation and to their use in one-component polyurethane stoving compositions, in particular for coil-coating applications.

2. Description of the Prior Art

There are only a few isocyanate blocking agents that combine good chemical properties, for example, slight thermal yellowing and low deblocking temperatures, and a reasonable cost. Diisopropylamine is such a blocking agent.

The use of diisopropylamine as an isocyanate blocking agent is known. For example, the preparation and use of a polyisocyanate blocked with diisopropylamine and based on trimerized isophorone diisocyanate is described in EP-96 210.

The use of a mixture of diisopropylamine and malonic ester is disclosed in EP-A 600 314. However, a disadvantage of diisopropylamine is also pointed out, i.e., that with certain polyisocyanates it forms blocked polyisocyanates that crystallise from solution and, thus, are not storage stable.

A technically and economically important polyisocyanate is the polyisocyanate containing isocyanurate groups that is based on 1,6-diisocyanatohexane (trimerized HDI). This polyisocyanate is known to impart particularly good visco-plastic behavior to the polyurethane coating compositions. It makes the coatings pliable and scratch resistant.

Coil coatings and can coatings require particularly good flexibility since they have to participate in the subsequent deformation of the coated metal sheets without being damaged.

In EP-A-600 314 it is pointed out that trimerized HDI cannot be blocked with diisopropylamine to form a crosslinking agent for dissolved one-component polyurethane stoving compositions, which are stable in storage, since these blocked polyisocyanates crystallise out of solution.

An object of the present invention is to provide a polyisocyanate crosslinking agent for one-component polyurethane stoving lacquers, in particular for the coil-coating applications, which is blocked with diisopropylamine, is stable in storage, does not crystallise from solution and shows slight thermal yellowing.

This object can be achieved with the blocked polyisocyanates described hereinafter.

SUMMARY OF THE INVENTION

The present invention relates to blocked polyisocyanate crosslinking agents, which are stable in storage, do not crystallise from solution and are the reaction products of A1) 30 to 70 equivalent % of a polyisocyanate component having an NCO content of 12 to 24 wt. % and containing lacquer polyisocyanates prepared from linear or branched aliphatic diisocyanates and having allophanate, biuret, isocyanurate, uretdione and/or urethane groups, and A2) 30 to 70 equivalent % of a polyisocyanate component having an NCO content of 8 to 15 wt. % and containing lacquer polyisocyanates prepared from cycloaliphatic diisocyanates and containing allophanate, biuret, isocyanurate, uretdione and/or urethane groups, wherein the equivalent percentages of polyisocyanate components A1 and A2 add up to 100 equivalent %, with B) 85 to 100 equivalent %, based on the isocyanate groups of components A1+A2, of a secondary aliphatic linear amine having a boiling point of 60 to 110° C. and C) 0 to 15 equivalent %, based on the isocyanate groups of components A1+A2, of chemically incorporated hydrazine derivatives corresponding to formula (I)

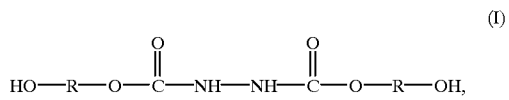

wherein
R represents a saturated hydrocarbon residue having 2 to 5 carbon atoms, and which contains in admixture D) 0.0 to 5.0 wt. %, based on the weight of components A1, A2 and C, of amines having a structural unit corresponding to formula (II)

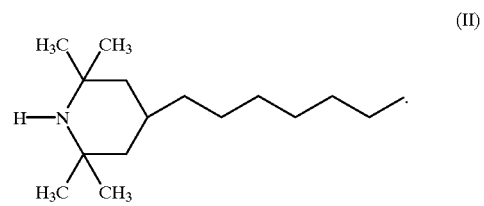

The present invention also relates to a process for the preparation of these blocked poylisocyanates in lacquer solvents by a) mixing, polyisocyanate components A1+A2 with at least a portion of the total solvent, b) reacting the polyisocyanate component with secondary aliphatic amine B) and optionally subsequently with stabiliser component C) until the product is substantially free from NCO groups and c) subsequently adding stabilizer component D) together with any remaining solvent.

Finally, the present invention relates to the use of these blocked polyisocyanates as crosslinking agents in one-component polyurethane stoving compositions, in particular for coil-coating applications.

DETAILED DESCRIPTION OF THE INVENTION

It is essential for the new blocked polyisocyanates according to the invention to be prepared from a blend of polyisocyanate components A1+A2. The blocked polyisocyanate may optionally contain chemically incorporated stabilizers C) and may optionally be present in physical admixture with stabilizer D.

Polyisocyanate component A1 is selected from known lacquer polyisocyanates which are prepared from 1,6-hexamethylene diisocyanate, contain biuret, iminooxadiazindion, isocyanurate, allophanate and/or uretdione groups and have an NCO content of 19 to 25 wt. %. Preferred are the lacquer polyisocyanates predominantly containing isocyanurate groups and prepared from 1,6-diisocyanatohexane, i.e., trimerized HDI. Trimerized HDI is employed in a quantity from 0.3 to 0.7 NCO equivalents, based on 1.0 NCO equivalent of the overall polyisocyanate component (A1+A2). This corresponds approximately to a quantity of 24 to 67 wt. %, based on the weight of polyisocyanate components A1+A2 of 100 wt. %.

Polyisocyanate component A2 is selected from lacquer polyisocyanates, which are prepared from cycloaliphatic diisocyanates, contain allophanate, biuret, isocyanurate, and/or urethane groups. Preferred cycloaliphatic diusocyanates include 1-isocyanato-3,3, 5-trimethyl-5-isocyanatomethylcyclo-hexane (IPDI) and 4,4-diisocyanato-dicyclo-hexylmethane (HMDI). Preferred are lacquer polyisocyanates predominantly containing isocyanurate groups and based on IPDI and HMDI in a quantity from 0.3 to 0.7 NCO equivalents, based on 1.0 NCO equivalent of the overall polyisocyanate component (A1+A2).

Also suitable for use as both polyisocyanate components A1 and A2 are mixed trimers of HDI and IPDI and/or HDI and HMDI in the appropriate equivalent ratios.

A suitable secondary aliphatic amines having a boiling-point from 60 to 110° C. (at room temperature and normal pressure) is diisopropylamine, for example, enters into consideration by way of.

Optional stabilizer component C is selected form hydrazine derivatives corresponding to formula I. The hydrazine derivatives are based on the reaction product of hydrazine hydrate with cyclic carbonates, for example with ethylene carbonate or isopropylene carbonate, as described in EP-A-0,050,284 (U.S. Pat. No. 4,369,301).

Preferred is the adduct resulting from 1 mole of hydrazine and 2 moles of propylene-1,2-carbonate:

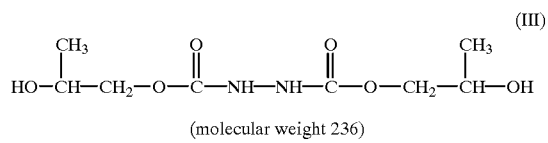

(molecular weight 236)

Optional stabilizing agent D corresponding to Formula (II) is selected from compounds with at least one 2,2,6,6-tetramethylpiperidinyl residue, the so-called HALS (hindered amine light stabilizer) ring. In the HALS compounds the piperidinyl nitrogen must be obtained in non-substituted manner, i.e., in accordance with the following structure:

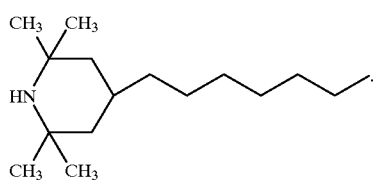

A particularly preferred stabilizing agent is the "HALS" compound marketed, inter alia, by Novartis under the designation Tinuvin 770 DF® corresponding to Formula (IV)

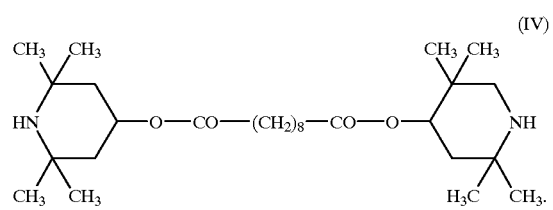

The process according to the invention is carried out at a temperature range of 20 to 120° C., preferably 70 to 90° C., in suitable solvents such as n-butyl acetate, methoxy-propyl acetate, toluene or higher aromatic solvent mixtures such as those marketed, for example, by Exxon under the Solvesso tradename. However, use may also be made of alcohols, for example isobutanol, after the NCO groups have reacted completely with the blocking agent and stabilizer C.

In accordance with a preferred embodiment of the present invention 1.0 NCO equivalent of the mixture of polyisocyanate components A1+A2 in solution is mixed with the entire quantity, e.g., 0.85 to 0.9 equivalents (0.85 to 0.9 moles) of diisopropylamine B and reacted completely at about 70° C. This reaction proceeds relatively quickly. The remaining isocyanate groups are reacted with, e.g., 0.1 to 0.15 NH equivalents of hydrazide component C for several hours at about 80° C. until all the NCO groups have reacted completely. A small stoichiometric excess of component C has a favorable effect on bringing about a low viscosity of the end product. Subsequently, the HALS component D and residual solvent, for example isobutanol, are admixed to obtain the desired viscosity.

The one-component stoving compositions are prepared by blending the blocked polyisocyanates according to the invention with the known organic polyhydroxyl compounds, such as polyester polyols or polyacrylate polyols. The one-component compositions are preferably used for coil-coating applications.

The coil-coatings prepared from these one-component compositions advantageously exhibit good stability in storage (they show no appreciable rise in viscosity over a period of at least 3 months) good reactivity and very slight thermal yellowing.

EXAMPLES

Example 1

A Blocked Polyisocyanate According to the Invention without Stabilizer Components C and D The polyisocyanate component contained 65.6 wt. %, of an HDI trimer (A1) and 34.4 wt. % of an IPDI trimer (A2).

Formulation:

| | |
|---|---|
| 140.0 g (0.7 g equiv.) | HDI trimer, NCO content about 21%, content of monomeric 1,6-diisocyanato-hexane about 0.2%, viscosity at 23° C. about 3,000 mPa.s |
| 105.0 g (0.3 g equiv.) | IPDI trimer, NCO content about 12%, 70% solution in solvent naphta |
| 106.0 g (1.05 g equiv.) | diisopropylamine |

-continued

Formulation:

| | |
|---|---|
| 70.0 g | methoxypropyl acetate |
| 70.5 g | isobutanol |
| 491.5 g (1.0 g. equiv.) | blocked polyisocyanate, solids: calc. 65% blocked NCO content: calc. 8.5% |

Preparation:

The two lacquer polyisocyanates were mixed with methoxypropyl acetate and heated to 50° C. Diisopropylamine was added in portions with stirring during which a slight exotherm was observed. After the addition was complete, stirring was continued for 30 min. at 70° C. The disappearance of the NCO groups was verified by IR spectroscopy. When NCO groups were no longer detected by IR spectroscopy, the resulting mixture was diluted with isobutanol and allowed to cool.

A clear, almost colorless solution was obtained, which had a viscosity (23° C.) of about 3,600 mPas and a blocked NCO equivalent weight of 491.5 g.

The blocked polyisocyanate was stable in storage. To the contrary as shown by EP-A 600 314 (U.S. Pat. No. 5,350,825), an HDI trimer blocked with diisopropylamine crystallised out of solution after about 2 weeks.

Example 2

A Blocked Polyisocyanate According to the Invention with Stabilizer Components C and D The polyisocyanate component contained the HDI trimer (A1) and the IPDI trimer (A2) in a weight ratio of about 1:1

Formulation:

| | | |
|---|---|---|
| 110.0 g (0.55 g. equiv.) | HDI trimer from Example 1 | |
| 157.5 g (0.45 g. equiv.) | IPDI trimer from Example 1 | |
| 90.9 g (0.9 mol) | diispropylamine | |
| 70.0 g | methoxypropyl acetate | |
| 14.1 g (0.12 g equiv.) | hydrazine adduct (reaction product of 1 mole of hydrazine hydrate with 2 moles of propylene carbonate, molecular weight 236) | |
| 3.2 g | Tinuvin 770 DF (HALS stabilizer, available from Novartis | |
| 64.8 g | methoxypropyl acetate | |
| 64.8 g | isobutanol | |
| 505.3 g (0.9 g. equiv.) | blocked polyisocyanate, solids: calc. 65% blocked NCO content: calc. 7.48% | |

Preparation:

The two lacquer polyisocyanates were mixed with methoxypropyl acetate and stirred at 70° C. with diisopropylamine for about 1 hour until an NCO content of about 1% was measured (theoretical NCO—0.99%). The hydrazine adduct was then added, the temperature was increased to 80° C. and the reaction mixture was stirred for about 10 hours at this temperature until NCO groups were no longer detected by IR spectroscopy). The HALS stabilizer, dissolved in isobutanol, was stirred into the still warm solution. The formulation was allowed to cool and a clear pale yellow solution was obtained having a viscosity (23° C.) of about 6,000 mPas and a blocked NCO equivalent weight of 561 g.

Example 3

Preparation of a Coil Coating Based on the Blocked Polyisocyanate According to the Invention from Example 2

The properties of the coating according to the invention were compared with an analogous coating that was produced from a blocked polyisocyanate crosslinking agent prepared by blocking an HDI trimer with butanone oxime.

Composition of the lacquer:

| | |
|---|---|
| 1172 g (1.172 g equiv. OH) | hydroxyl polyester (Alkynol 1665, 1 OH equivalent = 1,000 g, 65% solution, avilable from Bayer AG) |
| 657 g (1.172 g equiv. NCO) | blocked polyisocyanate from Example 2 |
| 1200 g | titanium dioxide (Bayertitan R-KB-4, available from Bayer AG) |
| 940 g | solvent naphta 200 S |
| 150 g | cellulose acetobutyrate (CAB 531-1, 10%, Krahn Chemie, Hamburg) |
| 60 g | additive (Acronal 4F, 50%, BASF AG) |
| 4179 g | lacquer formulation efflux time: 118 sec DIN 4 |

Lacquer properties:

| | Coating based on blocked polyisocyanate from Example 2 | Coating based on comparison blocked polyisocyanate (HDI trimer blocked with butanone oxime) |
|---|---|---|
| Gloss 20°/60° | 85–92 | 65–72 |
| White value | | |
| PMT[1] 216° C. | 91.7 | — |
| PMT 232° C. | | 84.1 |
| PMT 254° C. | 90.5 | 82.6 |
| Yellow value | | |
| PMT 216° C. | −1.0 | |
| PMT 232° C. | | −0.4 |
| PMT 254° C. | −0.8 | −0.8 |
| MEK wipe test | | |
| PMT 216° C. | 100× | |
| PMT 232° C. | | 100× |
| Impact test | 80 o.B. | 80 o.B. |
| Pencil hardness | F | HB |
| Adhesive strength 6 mm cupping, GT | 0 | 0 |
| t-bend test | | |
| flawless | 1.0 T | 1.0 T |
| adhesion OK | 1.0 T | 0.5 T |
| Efflux time | | |
| Immediately | 118 | 118 |
| After 3 d RT/50° C. | 124/150 | 124/140 |
| After 14 d RT/50° C. | 156/154 | 142/145 |

[1]PMT = peak metal temperature, object temperature

The coating based on the blocked polyisocyanate crosslinking agent according to the invention had superior gloss and a clearly higher white value after the stoving process.

In addition, it was more reactive than the comparison coating, which was evident from the lower PMT of 216° C. It was only possible to carry out tests, e.g., white-value, yellow-value and MEK wipe tests, on coatings cured at these temperatures when the coatings were based on the coatings according to the present invention.

Example 4

A Blocked Polyisocyanate According to the Invention with Stabilizer Components C and D The polyisocyanate component contained 0.6 equivalents or about 50 wt. %, of an HDI trimer (A1) and 0.4 equivalents or 50 wt. % of an HMDI trimer (A2).

| Formulation: | |
|---|---|
| 100.0 g (0.5 g equiv.) | HDI trimer from Example 1 of a |
| 189.5 g (0.5 g equiv.) | polyisocyanate consisting of 85 wt. % of an HMDI trimer and 15 wt. % HDI trimer, 75% in methoxypropyl acetate, |
| 90.0 g (0.9 mol) | diisopropylamine |
| 14.1 g (0.12 g equiv.) | hydrazine adduct according to Example 2 |
| 3.5 g | HALS from Example 2 |
| 93.2 g | methoxypropyl acetate |
| 93.2 g | isobutanol |
| 584.4 g | blocked polyisocyanate, solids: calc. 60% blocked NCO content: calc. 6.5% |

Preparation:

The two lacquer polyisocyanates were mixed with methoxypropyl acetate as described in Examples 1 and 2 and reacted with diisopropylamine at 70° C. until the calculated NCO content of 0.88% was almost attained. The hydrazine adduct was then added and stirring was continued for about 10 hours at 80° C. At this time NCO groups were no longer detectable by IR spectroscopy. The HALS stabilizer, dissolved in isobutanol, was stirred in, and the reaction mixture formulation was allowed to cool.

A clear pale-yellow solution was obtained having a viscosity (23° C.) of about 4,500 mPas and a blocked NCO equivalent weight of 464 g.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A blocked polyisocyanate crosslinking agent, which is stable in storage, does not crystallise from solution and is the reaction product of A1) 30 to 70 equivalent % of a polyisocyanate component having, an NCO content of 12 to 24 wt. % and containing a lacquer polyisocyanate prepared from a linear or branched aliphatic diisocyanate and having allophanate, biuret, isocyanurate, iminooxadiazindion, uretdione and/or urethane groups, and A2) 30 to 70 equivalent % of a polyisocyanate component having an NCO content of 8 to 15 wt. % and containing a lacquer polyisocyanate prepared from a cycloaliphatic diisocyanate and containing allophanate, biuret, isocyanurate, uretdione and/or urethane groups, wherein the equivalent percentages of polyisocyanate components A1 and A2 add up to 100 equivalent %, with B) 85 to 100 equivalent %, based on the isocyanate groups of components A1+A2, of a secondary aliphatic linear amine having a boiling point of 60 to 110° C. and C) 0 to 15 equivalent %, based on the isocyanate groups of components A1+A2, of chemically incorporated hydrazine derivatives corresponding to formula (I)

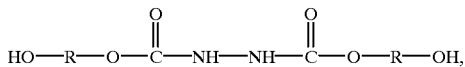

wherein
R represents a saturated hydrocarbon residue having 2 to 5 carbon atoms,
and which contains in admixture D) 0.0 to 5.0 wt. %, based on the weight of components A1, A2 and C, of amines having a structural unit corresponding to formula (II).

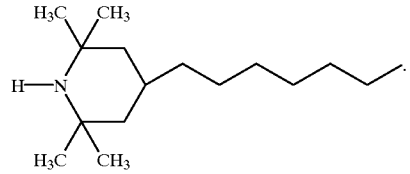

2. The blocked polyisocyanate crosslinking agent of claim 1 wherein component B) comprises diisopropylamine.

3. A process for the preparation of the blocked polyisocyanate crosslinking agent of claim 1 in a solvent which comprises a) mixing polyisocyanate components A1+A2 with at least a portion of the total solvent, b) reacting the polyisocyanate component with secondary aliphatic amine B) and optionally subsequently with stabilizer component C) until the product is substantially free from NCO groups and c) subsequently optionally adding stabilizer component D) together with any remaining solvent.

4. A one-component stoving composition containing the blocked isocyanate crosslinking agent of claim 1 and an organic polyhyhdroxyl compound.

* * * * *